United States Patent
Duggan

(10) Patent No.: US 10,036,487 B2
(45) Date of Patent: Jul. 31, 2018

(54) BRACKET AND BRACKET SYSTEM FOR SEISMIC CABLE SWAY BRACING SYSTEM

(71) Applicant: Daniel C. Duggan, Chesterfield, MO (US)

(72) Inventor: Daniel C. Duggan, Chesterfield, MO (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 15/066,912

(22) Filed: Mar. 10, 2016

(65) Prior Publication Data

US 2017/0261129 A1   Sep. 14, 2017

(51) Int. Cl.
| | |
|---|---|
| E04B 1/98 | (2006.01) |
| F16L 3/12 | (2006.01) |
| F16L 3/14 | (2006.01) |
| E04H 9/02 | (2006.01) |
| E02D 27/34 | (2006.01) |

(52) U.S. Cl.
CPC ............. *F16L 3/12* (2013.01); *E02D 27/34* (2013.01); *E04B 1/98* (2013.01); *E04H 9/02* (2013.01); *F16L 3/14* (2013.01)

(58) Field of Classification Search
CPC ...... F16L 3/12; F16L 3/14; E05D 5/00; A47F 5/00; F16G 11/00; E04B 1/98; E02D 27/34; E04H 9/02; E04H 9/021; E04H 9/027
USPC ........................................ 248/58, 63, 72, 73
See application file for complete search history.

(56) References Cited

U.S. PATENT DOCUMENTS

| | | | | |
|---|---|---|---|---|
| 2,508,340 | A * | 5/1950 | Spearrin | A41H 37/08 223/49 |
| 2,703,688 | A * | 3/1955 | Shuter | H02G 3/22 174/44 |
| 3,408,780 | A * | 11/1968 | Brister | E04D 1/30 248/237 |
| 3,808,586 | A * | 4/1974 | Bevacqua | H01B 7/40 174/72 A |
| 4,040,589 | A * | 8/1977 | McLay | E04B 1/49 248/217.1 |
| D250,088 | S * | 10/1978 | McDonald, Jr. | D8/355 |
| 4,278,225 | A * | 7/1981 | Phelps | A61J 1/06 248/311.3 |
| 5,143,171 | A * | 9/1992 | Glynn | A62B 35/04 182/3 |
| 5,224,246 | A * | 7/1993 | Royball | F16G 11/00 24/129 B |
| 5,310,255 | A * | 5/1994 | Ranallo | A47B 88/044 312/334.1 |

(Continued)

*Primary Examiner* — Nkeisha Smith
(74) *Attorney, Agent, or Firm* — Quarles & Brady LLP

(57) ABSTRACT

A bracket for use in a seismic cable sway bracing system to attach a bracing cable to a support structure or to an object to be braced is disclosed. The bracket includes a planar base having a base aperture therethrough, and at least one planar arm integrally formed with and extending from the planar base. The at least one planar arm being angled upwardly relative to the planar base and having an arm aperture therethrough. The bracket is configured so that a ratio of a first distance to a second distance is about 1:1.2 or greater, the first distance being defined from a center of the base aperture to an edge of the planar base opposite the at least one planar arm in a pre-angled arrangement, and the second distance being defined from the center of the base aperture to a center of the arm aperture in the pre-angled arrangement.

19 Claims, 8 Drawing Sheets

(56) References Cited

U.S. PATENT DOCUMENTS

| | | | | |
|---|---|---|---|---|
| 5,412,843 A * | 5/1995 | Krongauz | ............... | E05D 5/06 16/387 |
| 6,026,545 A * | 2/2000 | Duggan | ................ | E04H 9/02 24/129 B |
| 6,350,089 B1 * | 2/2002 | Tekavec | ............... | B60P 7/0807 410/101 |
| 6,415,560 B1 * | 7/2002 | Rinderer | ............... | F16B 7/18 248/351 |
| 6,837,009 B1 * | 1/2005 | Roth | ............... | E04H 9/02 24/563 |
| 6,848,873 B1 * | 2/2005 | Husk | ............... | B60R 9/10 410/106 |
| 6,971,623 B2 * | 12/2005 | Allmon | ................ | E04H 9/02 248/316.5 |
| 7,284,728 B2 * | 10/2007 | Connolly | ............... | F16L 3/11 248/58 |
| 7,819,364 B2 | 10/2010 | Duggan | | |
| 7,984,534 B2 * | 7/2011 | Duggan | ............... | F16G 11/00 24/115 K |
| 8,453,794 B2 * | 6/2013 | Melic | ............... | E04G 21/3276 182/230 |
| 8,870,135 B2 * | 10/2014 | Grubbs | ............... | F16L 3/14 248/200 |
| 2003/0047649 A1 * | 3/2003 | Miescher | ............... | F16L 3/11 248/58 |
| 2009/0289152 A1 * | 11/2009 | Crain | ............... | F16L 3/26 248/73 |
| 2009/0321587 A1 * | 12/2009 | Thackeray | ............... | F16L 3/133 248/58 |
| 2013/0037661 A1 * | 2/2013 | Grubbs | ............... | F16L 3/24 248/62 |
| 2014/0263909 A1 * | 9/2014 | Tsai | ............... | A47J 47/16 248/313 |
| 2016/0047493 A1 * | 2/2016 | Dickinson | ............... | F16L 3/08 248/73 |

* cited by examiner

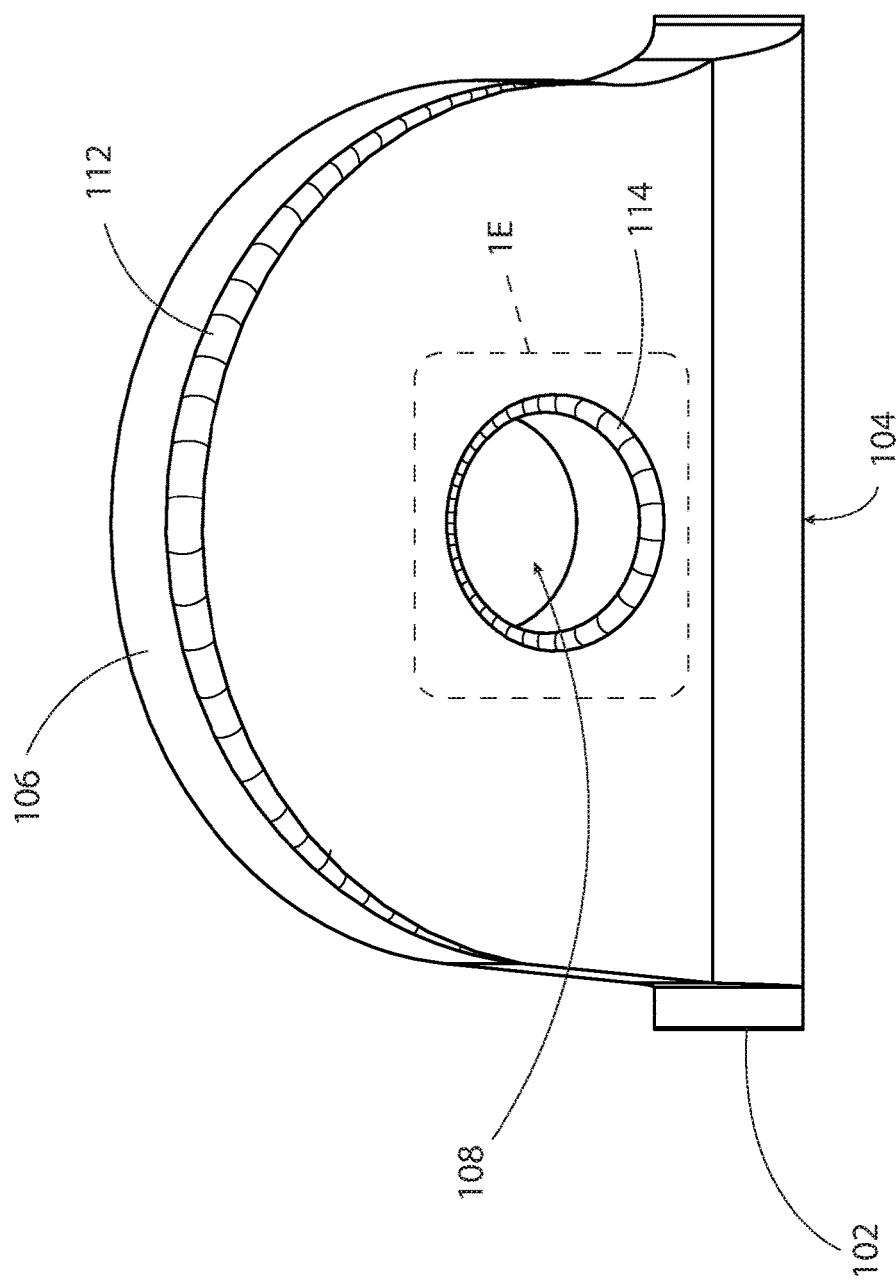

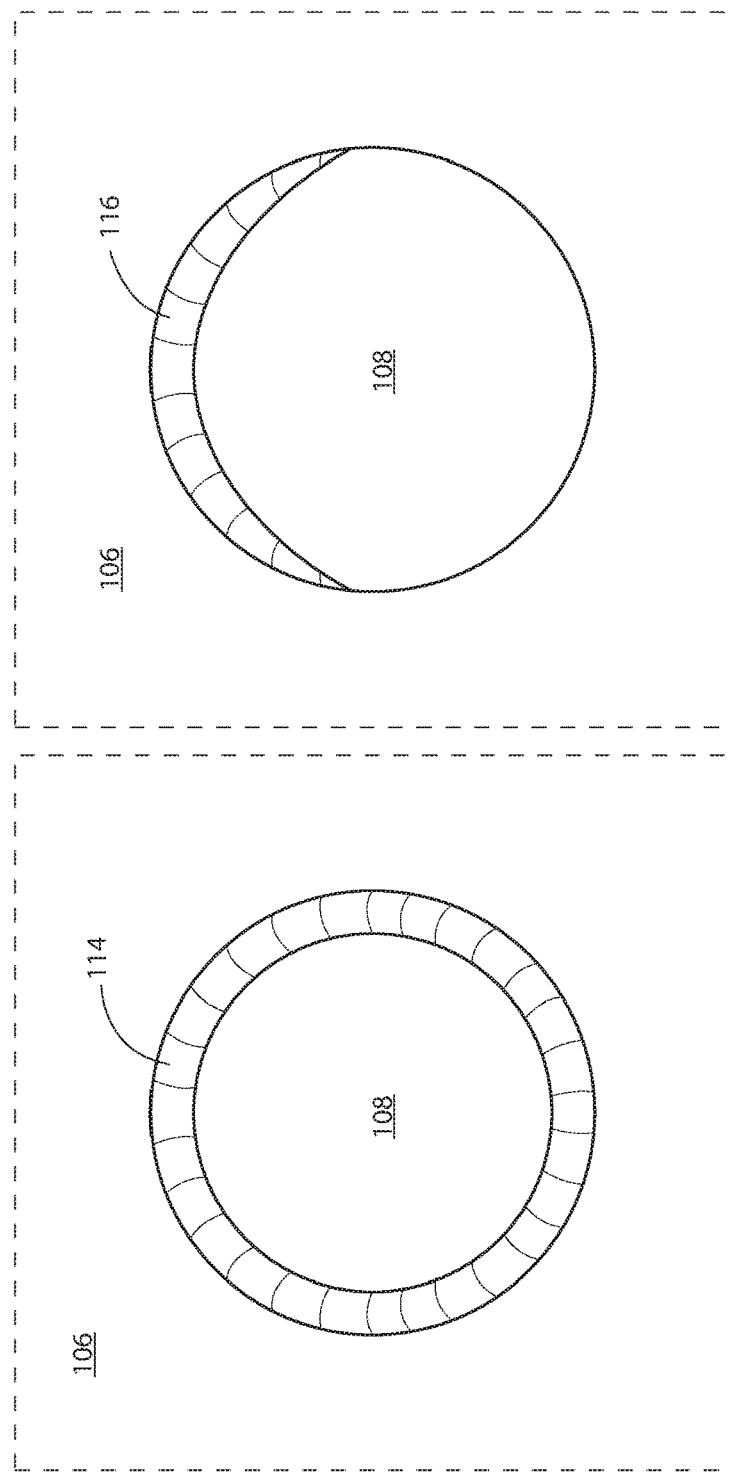

BRACKET AND BRACKET SYSTEM FOR SEISMIC CABLE SWAY BRACING SYSTEM

TECHNICAL FIELD

The present disclosure relates to brackets. More specifically, the present disclosure relates to brackets used in seismic cable sway bracing systems for stabilizing an object.

BACKGROUND

Various physical objects require mechanical stabilization, particularly when the objects are located in settings that experience seismic activity. With respect to stabilizing objects within buildings that are located in seismically active locations, such objects include, for example, various hanging objects, such as pipes, ducts, and conduit.

It is known that stabilizing objects with tension or bracing cables is more effective at dampening loads and reducing sway of the stabilized objects than with compression braces. Further, bracing techniques stabilize object movement in one direction (e.g., laterally or longitudinally) or in two directions (e.g., laterally and longitudinally). Bracing cables connect the object to be stabilized to a fixed support structure or foundation. Brackets are typically used for attaching the ends of the bracing cables to the objects to be stabilized and the support structures or foundations.

Brackets exist that can accommodate the different bracing techniques. For example, a single bracket can be used for one-directional bracing, or multiple brackets can be used for two-directional bracing. In the case of multiple brackets, the brackets can be stacked on top of each other to provide for multi-directional bracing. However, the stacking comes with several issues. One issue is the possibility of a stacked bracket interfering with the connection between the bracing cable and a lower bracket. Efforts have been made to mitigate this interference issues. However, these efforts present other issues, such as bracket deformation issues in response to certain loads and configurations of the brackets. Further, conventional brackets may cause wear or abrasion to the bracing cables based on the configuration of the brackets.

The below-described devices and systems solve many of the problems associated with the current art by providing stacked brackets that do not suffer from the deformation issues of the art, as well as brackets that also mitigate wear on bracing cables.

SUMMARY

According to aspects of the present disclosure, a bracket for use in a seismic cable sway bracing system to attach a bracing cable to a support structure or to an object to be braced is disclosed. The bracket includes a planar base having a base aperture therethrough. The bracket further includes at least one planar arm integrally formed with and extending from the planar base. The at least one planar arm is angled upwardly relative to the planar base and includes an arm aperture therethrough. The bracket is further configured to define a first distance from a center of the base aperture to an edge of the planar base opposite the at least one planar arm in a pre-angled arrangement. The bracket is further configured to define a second distance from the center of the base aperture to a center of the arm aperture in the pre-angled arrangement. Further, a ratio of the first distance to the second distance is about 1:1.2 or greater.

According to further aspects of the present disclosure, a bracket for use in a seismic cable sway bracing system to attach a bracing cable to a support structure or to an object to be braced is disclosed. The bracket includes a planar base having a base aperture therethrough. The bracket further includes first and second planar arms integrally formed with and angled relative to the planar base. The first planar arm includes a first arm aperture therethrough to receive a first bracing cable. The second planar arm includes a second arm aperture therethrough to receive a second bracing cable. Aspects of the disclosure include the edges of the first planar arm and the second planar arm around the first and second arm apertures being at least partially rounded to inhibit abrasion of the first and second bracing cables attached to the first and second planar arms, respectively.

According to further aspects of the present disclosure, a bracket for use in a seismic cable sway bracing system to attach a bracing cable to a support structure or to an object to be braced is disclosed. The bracket includes a planar base having a base aperture therethrough. The bracket further includes first and second planar arms integrally formed with and angled relative to the planar base. The first planar arm includes a first arm aperture therethrough to receive a first bracing cable. The second planar arm includes a second arm aperture therethrough to receive a second bracing cable. Aspects of the disclosure include the edges of the first planar arm and the second planar arm around the outer perimeters being rounded to inhibit abrasion of the first and second bracing cables attached to the first and second planar arms, respectively.

According to further aspects of the present disclosure, a bracket system for a seismic cable sway bracing system is disclosed. The system includes a first bracket and a second bracket. The first bracket includes a first planar base having a first base aperture therethrough to receive a mounting fastener. The first bracket further includes a first planar arm integrally formed with and extending from the first planar base. The first planar arm is angled upwardly relative to the first planar base and includes a first arm aperture therethrough to receive a first bracing cable. Similarly, the second bracket includes a second planar base having a second base aperture therethrough to receive the mounting fastener. The second bracket further includes a second planar arm integrally formed with and extending from the second planar base. The second planar arm is angled upwardly relative to the second planar base and includes a second arm aperture therethrough to receive a second bracing cable. The bracket system is configured so that the first arm aperture is not blocked by the second planar base, with the second bracket stacked on the first bracket in an offset arrangement, and the first bracket and the second bracket secured together on the mounting fastener.

These and other capabilities of the inventions, along with the inventions themselves, will be more fully understood after a review of the following figures, detailed description, and claims.

BRIEF DESCRIPTION OF THE DRAWINGS

Specific embodiments have been shown by way of example in the drawings and will be described in detail herein. It should be understood, however, that the disclosure is not intended to be limited to the particular forms shown. Rather, the disclosure is to cover all modifications, equivalents, and alternatives falling within the spirit and scope of the disclosure as defined by the appended claims.

FIG. 1D shows a detailed side view of the other arm of the bracket of FIG. 1A, in accord with aspects of the present concepts.

FIG. 1E shows a plan view of the aperture in the arm of FIG. 1D, in accord with aspects of the present concepts.

FIG. 1F shows a plan view of an alternative aperture in the arm of FIG. 1D, in accord with aspects of the present concepts.

DETAILED DESCRIPTION

Figure 1B:
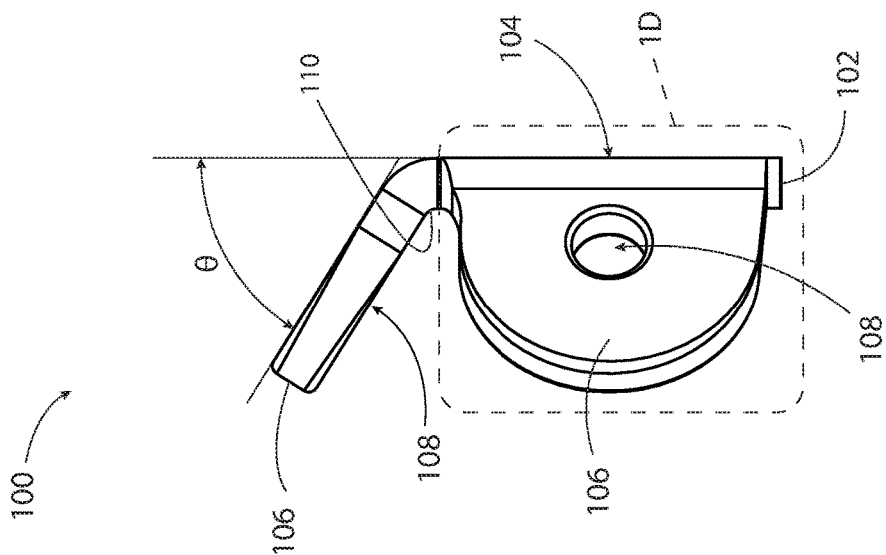
FIG. 1B shows a side view of the bracket of FIG. 1A from the viewpoint of the line 1B-1B, in accord with aspects of the present concepts.

While the inventions are susceptible of embodiment in many different forms, there is shown in the drawings and will herein be described in detail preferred embodiments of the inventions with the understanding that the present disclosure is to be considered as an exemplification of the principles of the inventions and is not intended to limit the broad aspects of the inventions to the embodiments illustrated.

To address the issues presented above, a bracket and bracket system for a seismic cable sway bracing system is disclosed that inhibits wear or abrasion on the bracing cables within the seismic cable sway bracing system. The bracket and bracket system further do not suffer from the issues of deformation of the bracket while allowing for stacked brackets that minimize or prevent blocking of the bracket apertures that accept bracing cables.

Figure 1A:
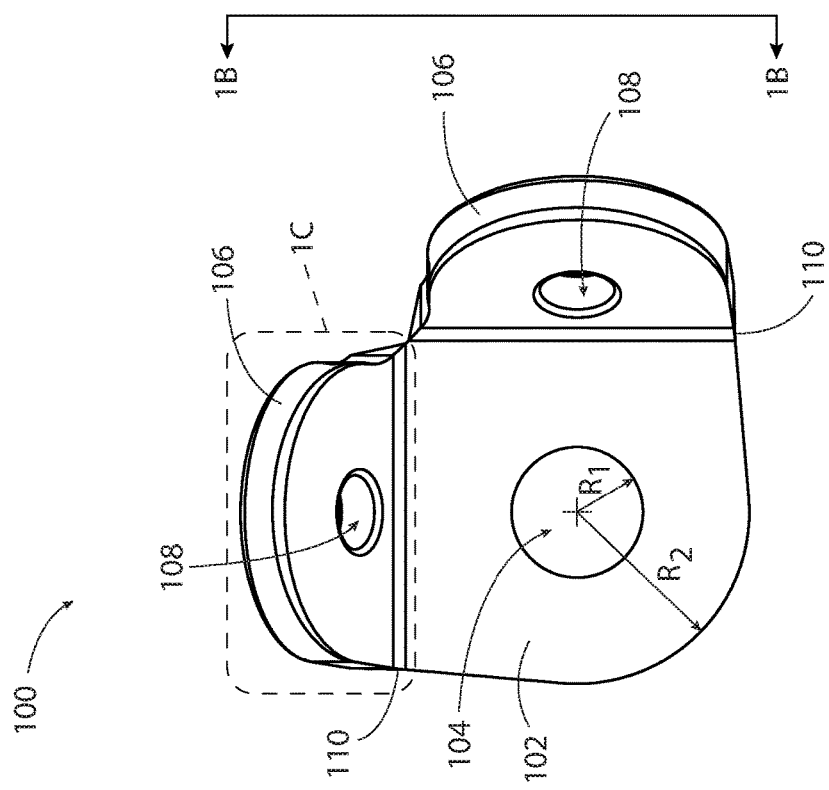
FIG. 1A shows a top view of a bracket, in accord with aspects of the present concepts.

Referring to FIGS. 1A and 1B, a bracket 100 for a seismic cable sway bracing system is shown, in accord with aspects of the present concepts. The bracket 100 includes a planar base 102. The planar base 102 can be formed of any conventional material typically used to form hardware, such as nuts, washers, etc. In some aspects, the planar base 102 is formed of stainless steel; however, the material used to form the planar base 102 can vary without departing from the spirit and scope of the present disclosure. Further, the planar base 102, or bracket 100 as a whole, may further be coated or plated with another material (e.g., metal, polymer, etc.), such as zinc, depending on the specific application of the bracket.

The planar base 102 can have various dimensions and thicknesses depending on the specific use of the bracket 100, such as the specific loads the bracket 100 will generally experience during use. A non-limiting example for the thickness of the planar base 102 is about 8 gauge.

The planar base 102 includes an aperture 104 that extends through the planar base 102. The aperture 104 is provided for accepting a mounting fastener therethrough for securing the bracket 100 to a support structure or an object to be braced or stabilized. In some aspects, the aperture 104 is generally centered in the planar base 102. However, the aperture 104 can alternatively be off-center. The aperture 104 also may be threaded or un-threaded.

The dimensions of the aperture 104, and specifically the radius $R_1$, can vary depending on the specific use of the bracket 100. Further, the dimensions of the radius $R_1$ of the aperture 104 can vary depending on the dimensions of the planar base 102 (or bracket 100 generally). Non-limiting examples for the radius $R_1$ of the aperture 104 include about 0.156 inch for a quarter-inch bracket 100, about 0.219 inch for a three-eighths-inch bracket 100, and about 0.281 inch for a half-inch bracket 100. However, the radius $R_1$ of the aperture 104 can vary, even with respect to the specific brackets 100 described herein, without departing from the spirit and scope of the present disclosure.

In some aspects, the planar base 102 may have a constant dimension for various different-sized apertures 104. For example, for the different sizes of apertures 104 listed above, the planar base 102 may have the same dimensions. Non-limiting examples of the dimensions of the planar base 102 include a radius $R_2$ in the range of about 0.5 inch to about 0.6 inch, such as about 0.57 inch. However, as shown, only a portion of the planar base 102 may be rounded. The non-rounded portions of the planar base 102 may be slightly larger, such as about 0.6 inch to about 0.7 inch in length from the center of the aperture 104.

The planar base 102 further includes one or more planar arms 106. In some aspects, the planar base 102 includes only one planar arm 106. However, as illustrated, the planar base 102 can include two planar arms 106, or even more than two planar arms 106 (e.g., three, four, etc.). The planar arms 106 are integrally formed with and extend from the planar base 102. Accordingly, the planar arms 106 are formed of the same material as the planar base 102. In further aspects, the planar arms 106 and the planar base 102 are formed from a unitary piece, as further described below with respect to FIG. 2.

In the case of two planar arms 106, the planar arms 106 extend from the planar base 102 to form a generally L-shaped bracket 100, as shown. That is, one planar arm 106 extends from the planar base 102 rotated generally 90° from the other planar arm 106. More specifically, however, the planar arms 106 can extend from the planar base 102 according to different arrangements, such as one planar arm 106 extending from the planar base 102 rotated generally 120°, 180°, etc. from the other planar arm 106.

Referring specifically to FIG. 1B, the planar arms 106 are angled relative to the planar base 102. For purposes of convenience, the planar arms 106 are described herein as being angled upwardly relative to the planar base 102; however, the angle may be characterized differently (e.g., downwardly) depending on the frame of reference. In some aspects, and as shown, the planar arms 106 are both angled in the same direction (e.g., upwardly). Alternatively, the planar arms 106 may instead be angled oppositely from each other, such as one planar arm 106 being angled upwardly, and one planar arm 106 being angled downwardly.

The angle θ of the planar arms 106 relative to the planar base 102 can be about 50° to about 70°. In preferred aspects, the angle θ is about 58°. Having an angle θ of about 58° relative to the planar base 102 minimizes or prevents deformation issues of the bracket 100 under operating loads. For example, having an angle less than about 50° may cause the planar arms 106 to deform relative to the planar base 102.

Such deformation may exceed the deformation limits of approving authorities, such as UL LLC.

A curved portion 110 joins the planar base 102 to the planar arms 106. The curved portion 110 generally is a bend in the bracket 100 without a loss in thickness to prevent or reduce the generation of a weak point in the bracket 100. In some aspects, the curved portion 110 has a radius of curvature at the inner part of the bend of about one-sixteenth of an inch. However, the radius of curvature can vary depending on the overall size of the bracket 100.

Each of the planar arms 106 includes an aperture 108. The apertures 108 allow for bracing cables to attach to the planar arms 106. Specifically, the bracing cables loop through the apertures 108 to secure to the bracket 100. The diameters of the apertures 108 are configured to accept the bracing cables therethrough. In some aspects, the apertures 108 are configured to alternatively accept both the bracing cables and supports for the bracing cables, such as thimbles, as part of bracing cable assemblies. However, the bracing cables do not require thimbles when interfacing with the bracket 100, at least in part for the reasons discussed below based on the bracket 100 having rounded edges. In some aspects, the apertures 108 are positioned closer to the planar base 102 than to the outer edges of the planar arms 106. However, alternatively, the apertures 108 can be generally centered in the planar arms 106.

Figure 1C:
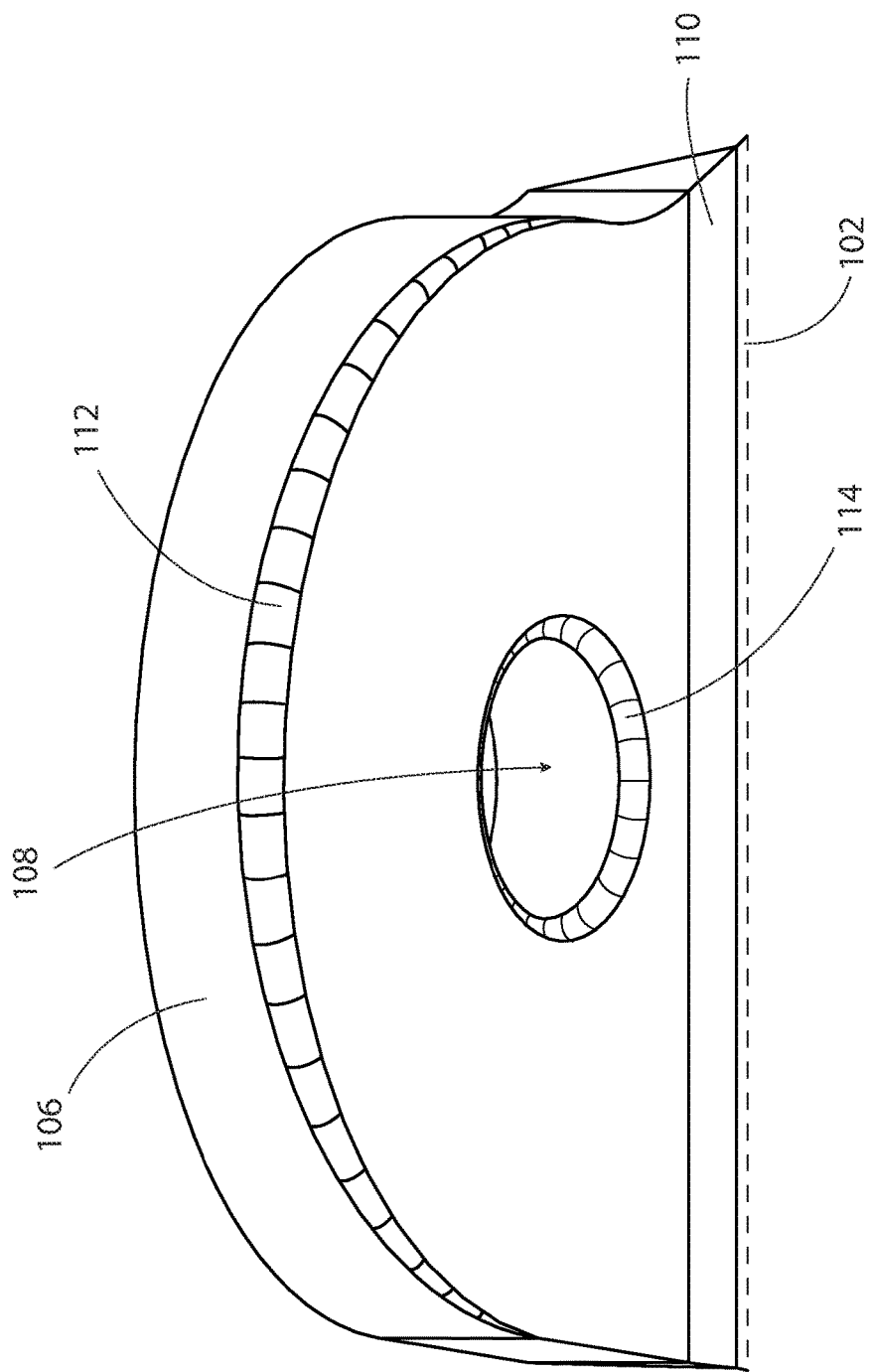
FIG. 1C shows a detailed top view of the arm of the bracket of FIG. 1A, in accord with aspects of the present concepts.

Referring to FIGS. 1C and 1D, FIG. 1C shows a detailed top view, and FIG. 1D shows a detailed side view, of the planar arms 106 of the bracket 100 of FIGS. 1A and 1B, within the dashed lines 1C and 1D, respectively, in accord with aspects of the present concepts. Specifically, FIG. 1C shows a detailed view of the inward-facing portion of the planar arms 106, and FIG. 1D shows a detailed view of the outward-facing portion of the planar arms 106. Because the planar arms 106 are configured to accept bracing cables of the seismic cable sway bracing system, the edges of the planar arms 106 can be configured to inhibit wear or abrasion to the bracing cables.

As shown, the outer perimeters of the planar arms 106 include rounded edges 112. To the extent that the bracing cables contact the rounded edges 112 when fastened to the bracket 100, the rounded edges 112 inhibit wear or abrasion to the bracing cables. In some aspects, the rounding of the rounded edges 112 at the outer perimeters can be constant. Alternatively, and as shown in FIGS. 1C and 1D, the rounding of the rounded edges 112 at the outer perimeters is tapered towards the planar base 102. The tapering provides the maximum rounding of the rounded edges 112 where the bracing cables contact the planar arms 102, and reduces the rounding where the bracing cables are less likely to contact the outer perimeters of the planar arms 106 during use.

As further shown in FIGS. 1C and 1D, the planar arms 106 also include, or can alternatively include, rounded edges 114 around the apertures 108. To the extent that the bracing cables contact the rounded edges 114 when fastened to the bracket 100, the rounded edges 114 inhibit wear or abrasion to the bracing cables.

Because the planar arms 106 include rounded edges 112 at the outer perimeter of the bracket 100, and/or rounded edges 114 around the apertures 108, bracing cables that connect to the bracket 100 through the planar arms 106 do not require supports, such as thimbles. Yet, the bracing cables experience less wear because of the rounded edges 112 and 114. Without the need to include supports, such as thimbles, for the bracing cables, installation of the seismic cable sway bracing system with the bracket 100 can be more versatile than compared to a seismic cable sway bracing system that requires support structures for the bracing cables. For example, without thimbles, swaged oval sleeves or ferrules can be placed on the bracing cables at any desired distance from the bracket 100. In contrast, a seismic cable sway bracing system that requires thimbles to secure the bracing cables to brackets requires installation of the swaged oval sleeves or ferrules against the thimbles to maintain engagement of the bracing cables with the thimbles. Accordingly, the rounded edges 112 and 114 provide for a more versatile bracket 100 that still inhibits wear of the bracing cables.

The rounded edges 112 and 114 can be formed according to various conventional hardware forming techniques. However, regardless of how the rounded edges 112 and 114 are formed, the rounded edges 112 and 114 are convex (e.g., rounded outwardly) so as to present a smooth, rounded surface to edges of the bracing cables. Thus, in some aspects, initially square edges at the outside perimeters of the planar arms 106 and around the apertures 108 can be beveled to form the rounded edges 112 and 114, respectively. Alternatively, the rounded edges can be formed when the apertures 108 and the outside perimeters are formed from blanks for the brackets 100, such as by stamping or coining of the material to form the apertures and outside perimeters.

FIG. 1E shows a plan view, or a view parallel to the longitudinal axis, of the aperture 108 in the planar arm 106 of FIG. 1D, in accord with aspects of the present concepts. However, although described with respect to the aperture 108 of FIG. 1D, the below discussion of the aperture 108 also applies to the aperture 108 as shown in FIG. 1C. As shown, the rounding of the rounded edge 114 is constant.

Alternatively, FIG. 1F shows a plan view, or a view parallel to the longitudinal axis, of the aperture 108 in the planar arm 106 of FIG. 1D (and FIG. 1C), in accord with aspects of the present concepts. As shown, the planar arm 106 may instead have a rounded edge 116 surrounding the aperture 108. The rounding of the rounded edge 116 is tapered such that the edge of the planar arm 106 around the aperture 108 that is distal to the planar base 102 (e.g., upper half as shown in FIG. 1F) is rounded, forming the rounded edge 116. The edge of the planar arm 106 around the aperture 108 that is proximal to the planar base 102 (e.g., lower half as shown in FIG. 1F) is flat or not rounded. Thus, the portion of the edge of the planar arm 106 at the aperture 108 that typically contacts the bracing cable (e.g., rounded edge 116) is rounded to inhibit wear or abrasion to the bracing cable, and the portion of the edge of the planar arm 106 at the aperture 108 that typically does not touch the bracing cable is not rounded.

Figure 2:
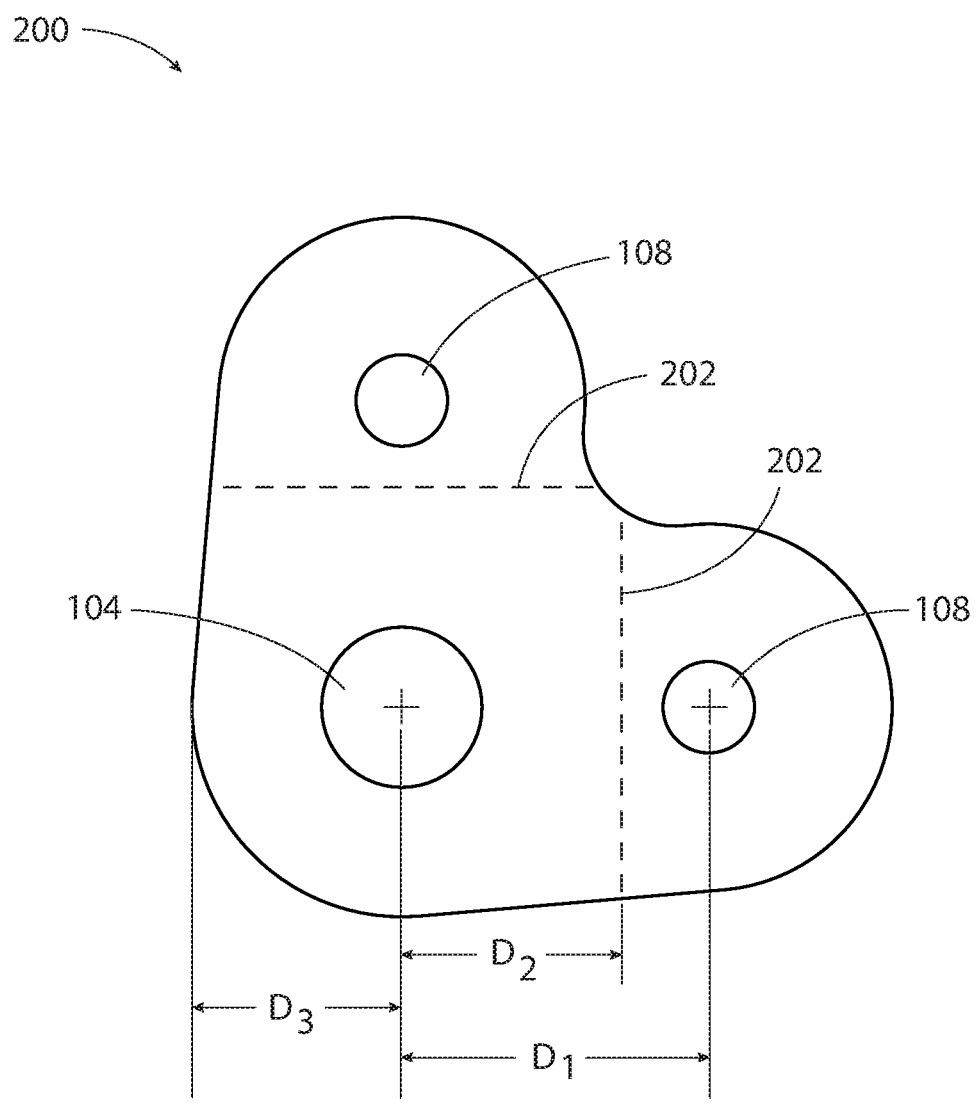
FIG. 2 shows a plan view of a blank for making the bracket of FIG. 1A, in accord with aspects of the present concepts.

FIG. 2 shows a plan view of a blank 200 for making the bracket 100 of FIG. 1A, in accord with aspects of the present concepts. The blank 200 is shown merely for the purpose of discussing various dimensions of the bracket 100 and is not meant to be limiting, such as to the process used to form the bracket 100. Thus, with respect to bending to form the planar arms 106, the blank 200 generally constitutes the bracket 100 prior to the planar arms 106 being bent. In some aspects, the edges of the blank 200 corresponding to the rounded edges 112 and 114 are already rounded. However, in some aspects, the rounded edges 112 and 114 are formed after bending the planar arms 106.

The dashed lines or bend lines 202 in FIG. 2 correspond to the locations of the curved portions 110 of the bracket 100 after the blank 200 is bent. As shown, the blank 200 includes, at least in part, three distances. Distance $D_1$ is the distance between the center of the aperture 104 and the center of the aperture 108. Distance $D_2$ is the distance between the center of the aperture 104 and the bend line 202. Distance $D_3$ is the distance between the center of the aperture 104 and the edge of the blank 200 (e.g., planar base 102) opposite from the aperture 108. Although the distances between the aperture 104 and only one aperture 108 are shown and described, the distances also apply to the other aperture 108. In such aspects, the blank 200 (and corresponding bracket 100) is symmetrical along a line extending through the center of the aperture 104 and bisecting the blank 200 equally between the two planar arms 106.

In accord with aspects of the present concepts, the distances $D_1$, $D_2$, and $D_3$ are configured so that when two brackets 100 formed from two blanks 200 are stacked in an offset arrangement (see FIG. 3C), with the apertures 104 generally aligned, the planar base 102 of the top bracket 100 does not block the apertures 108 of the bottom bracket 100, particularly when the resulting angle of the planar arms 106 relative to the planar base 102 is from about 50° to about 70°, and more particularly 58°. Accordingly, in some aspects, the distance $D_3$ is less than the distance $D_2$. In some aspects, the ratio of the distance $D_3$ to the distance $D_1$ is about 1:1.2 or greater, such as about 1:1.2 to about 1:5. In some preferred aspects, the ratio of the distance $D_3$ to the distance $D_1$ is about 1:1.4 or greater, such as about 1:1.4 to about 1:4. In some preferred aspects, the ratio of the distance $D_3$ to the distance $D_1$ is about 1:1.45 or greater, such as about 1.45 to about 1:2.

The specific ratio used for the distance $D_3$ to the distance $D_1$ may vary depending on, for example, the thickness of the blank 200 and the resulting bracket 100. For example, a first bracket 100 would have a larger ratio (e.g., 1:1.45 as compared to 1:1.2) than a second bracket 100, where the first bracket 100 is thicker than the second bracket 100. The larger ratio compensates for the larger thickness to still provide clearance for the apertures 108 of a lower bracket of two of the first bracket 100 stacked in an offset arrangement.

Applied to a specific set of dimensions for the blank 200, the distance $D_1$ can be about 0.84 inch, the distance $D_2$ can be about 0.60 inch, and the distance $D_3$ can be about 0.57 inch. According to such dimensions, the blank 200 (e.g., resulting bracket 100) can have a radius $R_2$ of about 0.57 inch, the aperture 104 can have a radius $R_1$ of about 0.156 to 0.281 inch, and the aperture 108 can have a radius of about 0.125 inch. Further, the thickness of the blank 200 can be about 8 gauge for these specific dimensions.

The specific dimensions can vary with respect these depending on, for example, the overall size of the resulting bracket 100. However, based on the above ratios, in addition to the ratios in combination with the angles of about 50° to about 70° of the planar arms 106, and more particularly 58°, and the thickness of the blank 200, the resulting bracket 100 can be stacked in an offset arrangement without interfering with the apertures 108. Moreover, the resulting brackets 100 do not suffer from deformation issues as compared to, for example, brackets with angles between arms and bases that are less than 50°.

Figure 3A:
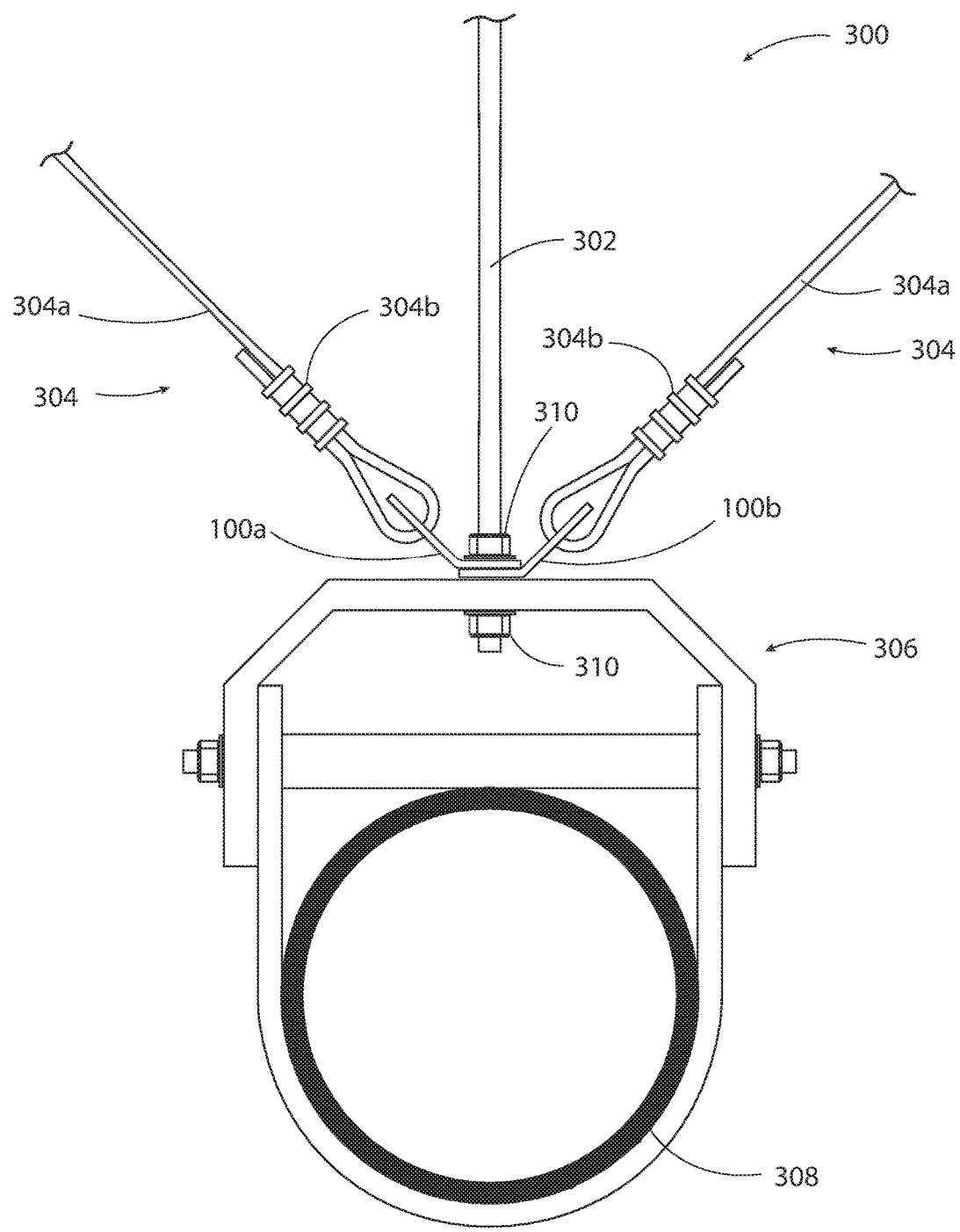
FIG. 3A shows a side view of a seismic cable sway bracing system, in accord with aspects of the present concepts.
Figure 3B:
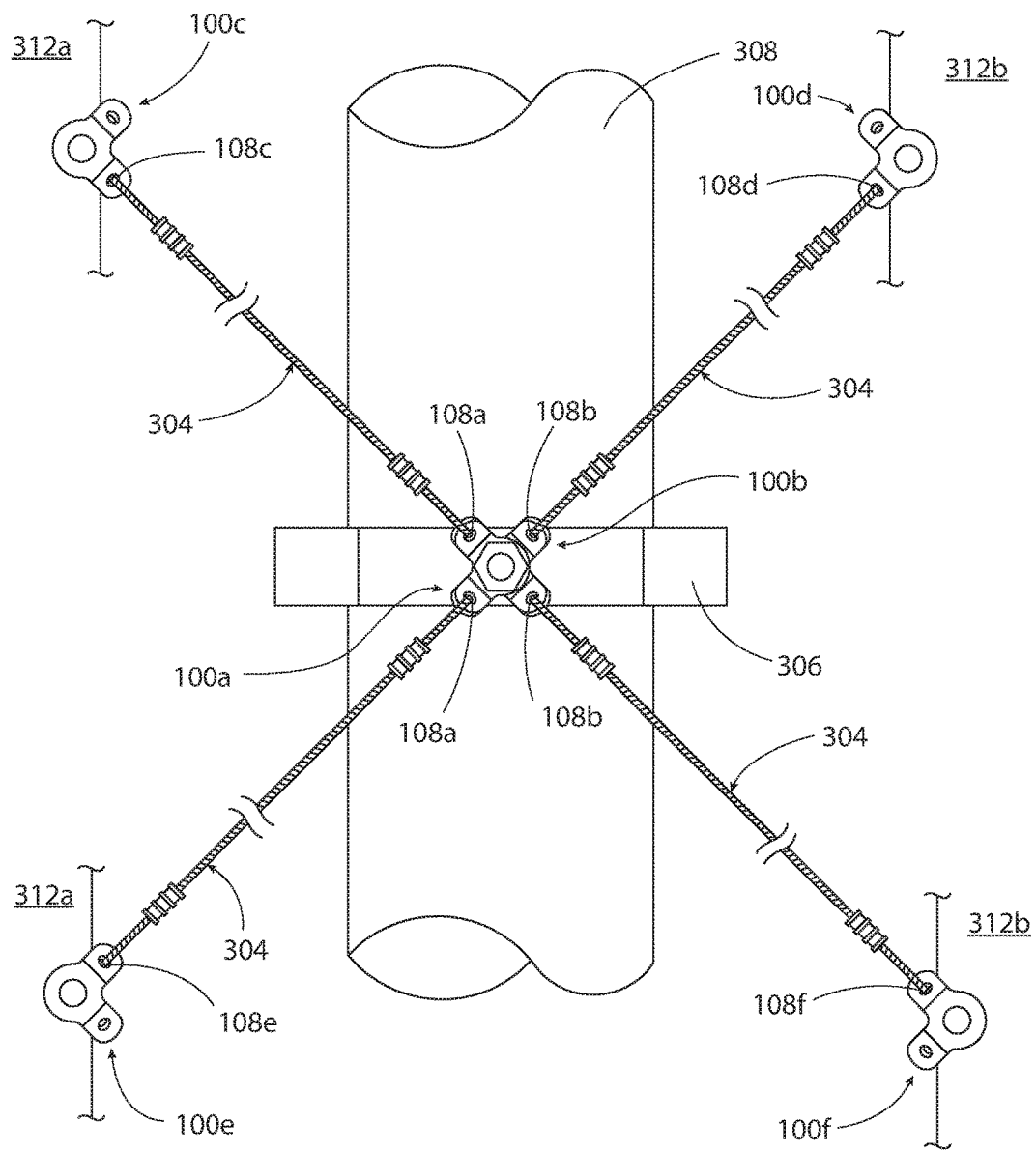
FIG. 3B shows a top view of the seismic cable sway bracing system of FIG. 3A, in accord with aspects of the present concepts.

Referring now to FIGS. 3A and 3B, FIG. 3A shows a side view of a seismic cable sway bracing system 300, and FIG. 3B shows a top view of the seismic cable sway bracing system 300, in accord with aspects of the present concepts. Although shown and described with respect to a vertically hanging seismic cable sway bracing system, aspects of the present disclosure apply to all types of seismic cable sway bracing systems, and the system 300 is merely for explanation in general and is not meant to be limiting.

The system 300 includes a rod 302 extending from a support structure, such as, for example, a ceiling. The rod 302 extends through two brackets 100a, 100b. Specifically, the rod 302 extends through the apertures 104a, 104b of the planar bases 102a, 102b of the brackets 100a, 100b. The rod 302 further extends through a support member 306, which is the object to be braced or stabilized by the seismic cable sway bracing system 300. The support member 306 may be for supporting a pipe 308, as shown. However, the support member 306 may be for supporting one or more other elements, such as one or more other building elements, including pipes, ducts, and conduit. One or more pieces of hardware 310 (e.g., one or more nuts) secure the rod 302 to the brackets 100a, 100b and the support member 306.

In addition to the rod 302 and the support member 306, the brackets 100a, 100b are secured to bracing cable assemblies 304. The bracing cable assemblies 304 include bracing cables 304a. The bracing cable assemblies 304 further include swaged oval sleeves or ferrules 304b that secure the bracing cables 304a and bracing cable assemblies 304 to the brackets 100a, 100b. Although not required, and not shown for illustrative convenience, the bracing cable assemblies 304 may alternatively also include bracing cable supports (e.g., thimbles) that extend through the apertures 108a, 108b of the brackets 100a, 100b.

Referring to FIG. 3B, opposite ends of the bracing cable assemblies 304 are attached to brackets 100c-100f through the apertures 108c-108f, respectively. The bracing cable assemblies 304 are attached to the brackets 100c-100f as described above with respect to brackets 100a, 100b. The brackets 100c-100f are further attached to support structures, such as brackets 100c, 100e being attached to support structure 312a and brackets 100d, 100f being attached to support structure 312b. The support structures 312a, 312b can be any structure that provides a support or foundation for a seismic cable sway bracing system, such as a wall or a foundation of a building.

Figure 3C:
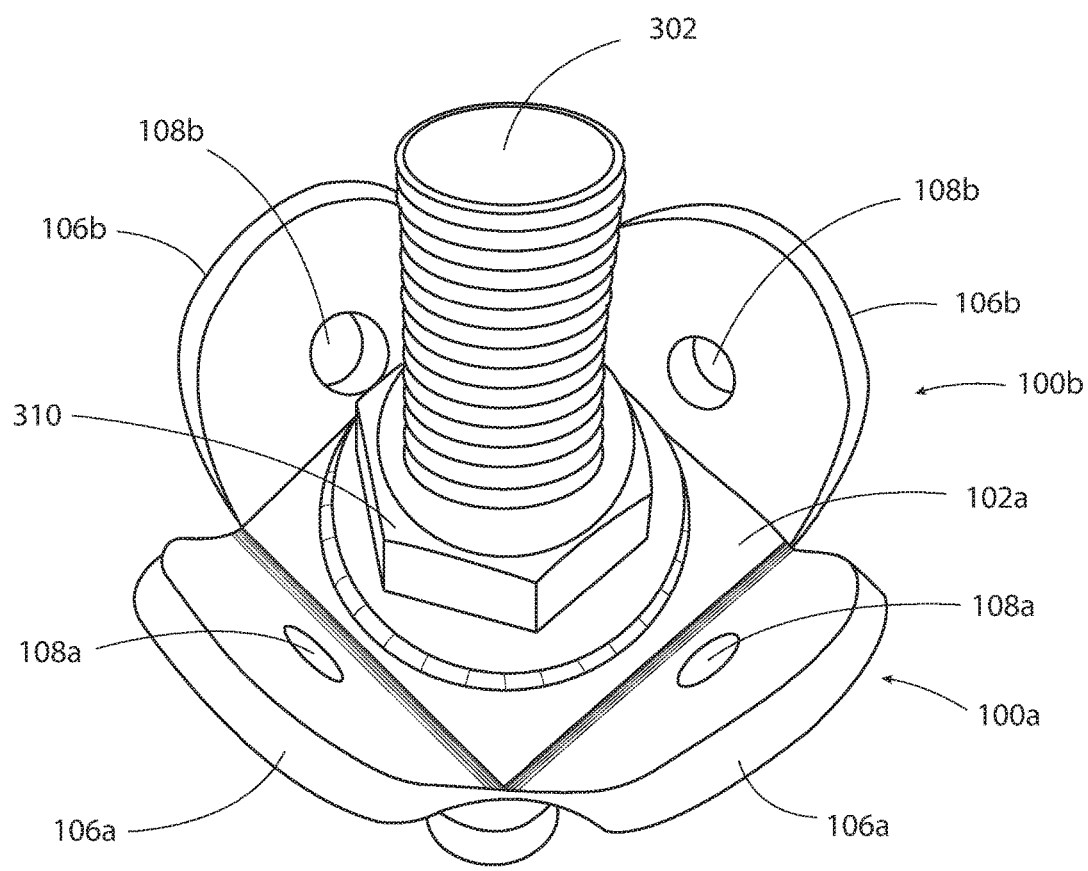
FIG. 3C shows a detailed perspective view of a bracket system used in the seismic cable sway bracing system of FIG. 3A, in accord with aspects of the present concepts.

FIG. 3C shows a detailed view of the overlapping brackets 100a, 100b in FIGS. 3A and 3B in the seismic cable sway bracing system 300, with the bracing cable assemblies 304 omitted for illustrative convenience. As shown, the bracket 100a is stacked on top of the bracket 100b in an offset arrangement, with the planar arms 106a of the bracket 100a located across from the planar arms 106b of the bracket 100b. Further, the planar base 102a of the bracket 100a does not block the apertures 108b of the bracket 100b, despite the bracket 100a being above the bracket 100b. The planar base 102a does not block the apertures 108b based, in part, on the relationships between the distances $D_1$, $D_2$, and $D_3$ of the brackets 100a, 100b. Moreover, although not shown for illustrative convenience, the edges of the brackets 100a, 100b are rounded, as described above, to inhibit wear on the bracing cable assemblies 304 (e.g., bracing cables 304a).

According to the configurations of the brackets 100 described herein, two brackets 100 (e.g., brackets 100a, 100b) can be used to attach four bracing cable assemblies (e.g., bracing cable assemblies 304) to an object to be stabilized (e.g., support member 306). Moreover, wear or abrasion is inhibited based on the brackets 100 having rounded edges (e.g., rounded edges 112 and 114) where the brackets 100 contact the bracing cables of the bracing cable assemblies. Further, the brackets 100 can also be used to attach the bracing cable assemblies to the support structures (e.g., 312a, 312b), making the brackets more versatile within a seismic cable sway bracing system.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A bracket for use in a seismic cable sway bracing system to attach a bracing cable to a support structure or to an object to be braced, the bracket comprising:
a planar base having a base aperture therethrough; and
at least one planar arm integrally formed with and extending from the planar base, the at least one planar arm being angled upwardly 58° relative to the planar base and having an arm aperture therethrough,
wherein a first distance is defined from a center of the base aperture to an edge of the planar base opposite the at least one planar arm in a pre-angled arrangement, a second distance is defined from the center of the base aperture to a center of the arm aperture in the pre-angled arrangement, and a ratio of the first distance to the second distance is 1:1.4 to 1:1.6, and
wherein the ratio of the first distance to the second distance and the angle of the at least one planar arm to the planar base inhibit deformation of the bracket under operating loads.

2. The bracket of claim 1, wherein the ratio of the first distance to the second distance is 1:1.4 to 1:1.5.

3. The bracket of claim 2, wherein the ratio of the first distance to the second distance is 1:1.45.

4. The bracket of claim 1, wherein a thickness of the planar base and the at least one planar arm is about 8 gauge.

5. The bracket of claim 1, wherein the bracket includes a first planar arm and a second planar arm as the at least one planar arm, the second planar arm extending from the planar base rotated generally 90° relative to the first planar arm.

6. The bracket of claim 1, wherein edges of the at least one planar arm around the outer perimeter are rounded.

7. The bracket of claim 6, wherein edges of the at least one planar arm around the outer perimeter distal to the planar base are rounded more than edges of the at least one planar arm around the outer perimeter proximate to the planar base, to provide a tapered rounding of the outer perimeter.

8. The bracket of claim 1, wherein at least part of edges of the at least one planar arm around the arm aperture are rounded.

9. The bracket of claim 8, wherein distal portions of the edges of the at least one planar arm around the arm aperture relative to the planar base are rounded, and proximal portions of the edges of the at least one planar arm around the arm aperture relative to the planar base are flat.

10. The bracket of claim 1, wherein edges of the at least one planar arm around the outer perimeter and around the arm aperture are rounded.

11. A bracket for use in a seismic cable sway bracing system to attach a bracing cable to a support structure or to an object to be braced, the bracket comprising:
a planar base having a base aperture therethrough; and
first and second planar arms integrally formed with and angled upwardly 58° relative to the planar base, the first planar arm having a first arm aperture therethrough to receive a first bracing cable, and the second planar arm having a second arm aperture therethrough to receive a second bracing cable,
wherein edges of the first and second planar arms around the first and second arm apertures are at least partially rounded to inhibit abrasion of the first and second bracing cables attached to the first and second planar arms, respectively,
wherein a first distance is defined from a center of the base aperture to an edge of the planar base opposite the first planar arm in a pre-angled arrangement, a second distance is defined from the center of the base aperture to a center of the first arm aperture in the pre-angled arrangement, and a ratio of the first distance to the second distance is 1:1.4 to 1:1.6, and
wherein the ratio of the first distance to the second distance and the angles of the first and second planar arms relative to the planar base inhibit deformation of the bracket under operating loads.

12. The bracket of claim 11, wherein distal portions of edges of the first and second planar arms around the first and second arm apertures relative to the planar base are rounded, and proximal portions of edges of the first and second planar arms around the first and second arm apertures relative to the planar base are flat.

13. The bracket of claim 11, wherein (i) the ratio of the first distance to the second distance, (ii) angles of the first and second planar arms relative to the planar base, and (iii) a thickness of the planar base are configured such that a planar base of a first bracket stacked on a second bracket in an offset arrangement does not block the first and second arm apertures of the second bracket.

14. A bracket for use in a seismic cable sway bracing system to attach a bracing cable to a support structure or to an object to be braced, the bracket comprising:
a planar base having a base aperture therethrough; and
first and second planar arms integrally formed with and angled upwardly 58° relative to the planar base, the first planar arm having a first arm aperture therethrough to receive a first bracing cable, and the second planar arm having a second arm aperture therethrough to receive a second bracing cable, the first and second planar arms having outer perimeters,
wherein edges of the first and second planar arms around the outer perimeters are rounded to inhibit abrasion of the first and second bracing cables attached to the first and second planar arms, respectively, and
wherein a first distance is defined from a center of the base aperture to an edge of the planar base opposite the first planar arm in a pre-angled arrangement, a second distance is defined from the center of the base aperture to a center of the first arm aperture in the pre-angled arrangement, and a ratio of the first distance to the second distance is 1:1.4 to 1:1.6, and
wherein the ratio of the first distance to the second distance and the angles of the first and second planar arms relative to the planar base inhibit deformation of the bracket under operating loads.

15. The bracket of claim 14, wherein a first line intersecting a center of the base aperture and a center of the first arm aperture is perpendicular to a second line intersecting the center of the base aperture and a center of the second arm aperture.

16. The bracket of claim 14, wherein edges of the first and second planar arms around the first and second arm apertures are rounded to inhibit abrasion of the first and second bracing cables attached to the first and second planar arms, respectively.

17. A bracket system for a seismic cable sway bracing system comprising:

a first bracket including:
   a first planar base having a first base aperture therethrough to receive a mounting fastener; and
   a first planar arm integrally formed with and extending from the first planar base, the first planar arm being angled upwardly 58° relative to the first planar base and having a first arm aperture therethrough to receive a first bracing cable; and
a second bracket including:
   a second planar base having a second base aperture therethrough to receive the mounting fastener; and
   a second planar arm integrally formed with and extending from the second planar base, the second planar arm being angled upwardly 58° relative to the second planar base and having a second arm aperture therethrough to receive a second bracing cable,
wherein the first arm aperture is not blocked by the second planar base, with the second bracket stacked on the first bracket in an offset arrangement, and the first bracket and the second bracket secured together on the mounting fastener, based on a ratio of a first distance, defined from a center of the second base aperture to an edge of the second planar base opposite the second planar arm in a pre-angled arrangement, to a second distance, defined from the center of the second base aperture to a center of the second arm aperture in the pre-angled arrangement, being 1:1.4 to 1:1.6, and
wherein the ratio of the first distance to the second distance and the angles of the first planar arm to the first planar base and the second planar arm to the second planar base inhibit deformation of the first bracket and the second bracket under operating loads.

18. The bracket system of claim 17, wherein edges of the first planar arm and the second planar arm around the outer perimeters are rounded.

19. The bracket system of claim 17, wherein edges of the first and second arm apertures are rounded.

* * * * *